United States Patent [19]
Pavelka

[11] 3,819,001
[45] June 25, 1974

[54] TRACTOR WITH FULL SWIVEL FRONT SECTION

[76] Inventor: Clement C. Pavelka, 376 Orange Dr., Oxnard, Calif. 93030

[22] Filed: Aug. 2, 1973

[21] Appl. No.: 385,066

[52] U.S. Cl. .................................... 180/19 H
[51] Int. Cl. .................................... B62d 51/04
[58] Field of Search ...... 180/11, 12, 13, 19 R, 19 S, 180/19 H, 6.66, 6.6

[56] References Cited
UNITED STATES PATENTS

| | | | |
|---|---|---|---|
| 3,038,550 | 6/1962 | Lehmann et al. | 180/19 R X |
| 3,154,162 | 10/1964 | McCaleb et al. | 180/6.66 |
| 3,370,666 | 2/1968 | Holtzclaw | 180/19.5 X |
| 3,439,764 | 4/1969 | Kimball | 180/19 R X |

Primary Examiner—M. Henson Wood, Jr.
Assistant Examiner—Gene A. Church
Attorney, Agent, or Firm—John E. Kelly; Pastoriza & Kelly

[57] ABSTRACT

A tractor has a mobile frame section carrying a hitch for connection with a mobile home or the like and a front section capable of being fully swivelled about its axis. Arching upwardly and forwardly from the mobile frame is a neck that is rigidly connected to a vertically disposed barrel which rotatably mounts a drum associated with the tractor front section. A columnar chassis extends from the axle and entirely through the drum so an upper part can support a motor and pivotally mount a steering mechanism. The steering mechanism is a U-shaped swing bar that can be maneuvered through a broad arc to clear the motor and other components while being swung from one side of the tractor to the other.

20 Claims, 5 Drawing Figures

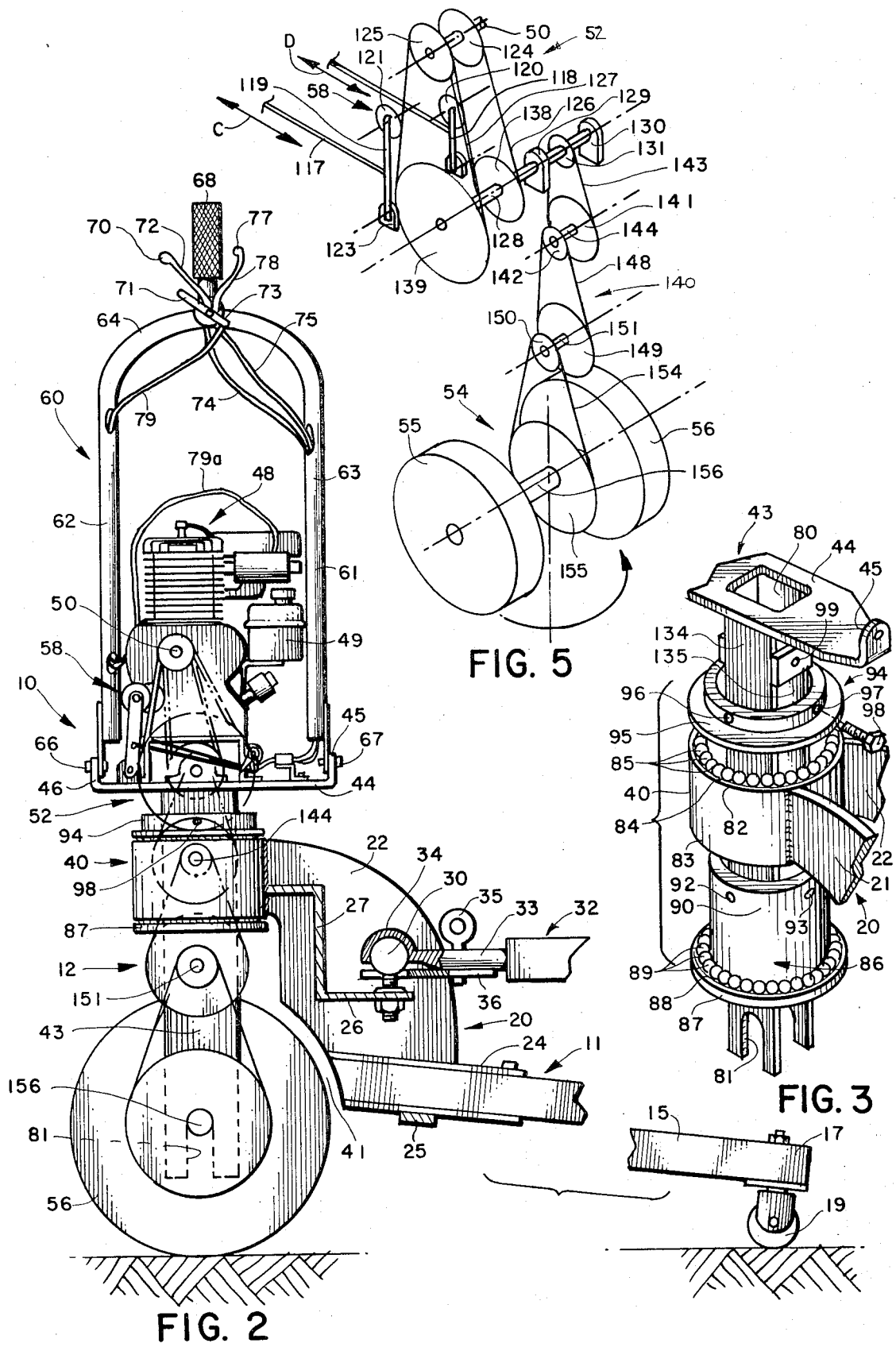

TRACTOR WITH FULL SWIVEL FRONT SECTION

BACKGROUND OF THE INVENTION

This invention generally relates to tractors or dollies for towing heavy wheeled vehicles or objects and more specifically relates to a self-propelled tractor.

It is often desirable to relocate large vehicles such as mobile homes, aircraft, boat trailers, etc., from one nearby place to another.

This may be accomplished by towing them with a tractor or dolly of the type generally disclosed, for example, in U.S. Pat. No. 3,370,666 to Holtzclaw et al. for a "Trailer Maneuvering Device;" U.S. Pat. No. 3,166,141 to Shields et al. for a "Tractor," and U.S. Pat. No. 3,356,172 to Peckham et al. for a "Motor Driven Dolly for Trailers."

Ideally, a tractor should be self-powered, compact to operate within a small working area, easily maneuverable and versatile. Most tractors are not easily maneuverable and versatile and are commonly deficient in other requirements. In this regard, the steering mechanisms of conventional tractors are not capable of fully swivelling through 360 degrees to negotiate difficult turns and facilitate the efforts of workmen.

The rare tractor which does have full rotation capability, e.g., U.S. Pat. No. 3,154,162 to McCaleb et al. for a "Rotatable Prime Mover" is bulky which increases the risk of bumping into objects, and mechanically complex.

SUMMARY OF THE INVENTION

Briefly stated, this invention relates to a tractor for towing vehicles and the like wherein a front section is capable of fully rotating about its axis and relative to a rear section, i.e., a mobile frame.

In its broader aspects, the tractor includes a customary mobile frame having a hitch for detachable engagement with a vehicle to be towed such as a mobile home, aircraft, boat trailer, etc.

An upright barrel is fixed to a front portion of the mobile frame in a manner so that the mobile frame and barrel together define a wheel maneuvering space located beneath the barrel and generally ahead of the mobile frame. A front section of the tractor includes a drum that is swively coupled to and disposed within the barrel in a manner so that the drum may be fully swivelled through 360 degrees in either a clockwise or counterclockwise direction.

A chassis extends through and is coupled to the drum and has a top section which extends above the barrel and a bottom section that extends beneath the barrel. A motor is coupled to the chassis top section.

A steering mechanism is connected to either the motor or the chassis top section for use by a workman in maneuvering the tractor from one place to another. Drive wheel means preferably in the form of dual wheels are coupled to the chassis bottom section fully beneath the barrel and drum. The drive wheel means is sufficiently spaced from the mobile frame and the barrel so that the wheels may be fully turned through 360 degrees within the wheel maneuvering space without contacting the mobile frame.

Drive means operatively interconnect the motor and the drive wheel means. An actuating means is operatively coupled to the drive means for selectively activating the drive means when the motor is in operation.

To achieve full rotation of the drum within the barrel, one end of the drum is formed with a radially outwardly extending flange that coacts with the corresponding end of the barrel in defining a first circular track for a plurality of round bearing elements. The other end of the drum includes a separable ring that coacts with the corresponding end of the barrel in defining a second circular track for a plurality of round bearing elements such as ball bearings. The separable ring fully surrounds and is connected to the chassis.

The chassis top section has a platform which pivotally mounts the steering mechanism. The chassis platform is formed through a central portion with a space located above the drum. The chassis is generally a hollow column and a portion of the drive means, for compactness, extends through the space in the chassis platform and is generally totally confined by the chassis.

The drive means has a dual speed capability. First and second pulley systems are coupled to a power take-off shaft of the motor. The first pulley system has a relatively large diameter drive disc fixed to a first power transmission shaft and the second pulley system has a relatively small diameter drive disc fixed to the first power transmission shaft. When the first and second pulley systems are selectively activated by the actuating means, then the drive wheels will be caused to travel at a relatively low speed under load bearing conditions and at a relatively high speed for walking or non-load bearing conditions, respectively. The drive means incorporates a gear reduction means.

The actuating means includes first and second clutches arranged to selectively activate the corresponding first and second pulley systems. The first and second clutches include first and second idler wheels capable of being forced into selective engagement with the corresponding first and second pulley systems.

Preferably the steering mechanism includes a U-shaped swing bar pivotally connected by its side arm to the chassis at points on opposite sides of the motor. The side arms are sufficiently long and spaced from one another to clear the motor and enable the swing bar to be swung over the motor from one side of the tractor to another. The steering mechanism mounts hand levers with control cables which constitute part of the actuating means for operating the drive means and causing it to move the tractor at one speed or the other.

The mobile frame is a V-shaped frame including a pair of stringers supported on wheels. The stringers converge forwardly towards the barrel. A generally upwardly extending linking neck rigidly interconnects forward portions of the stringers to the barrel and operates to hold the barrel fully above and in front of the stringers. The hitch is a ball and socket type hitch.

BRIEF DESCRIPTION OF THE DRAWINGS

The numerous benefits and unique aspects of the present invention will be fully understood when the following detailed description is studied in conjunction with the drawings in which:

FIG. 2 is a side elevational, partially sectional, partially phantom line view showing the steering mechanism erect and the socket of a mobile home or the like coupled with the ball hitch of the tractor;

FIG. 3 is a perspective fragmentary and exploded view showing the barrel and drum components and the columnar chassis extending entirely through the barrel and drum;

DETAILED DESCRIPTION OF THE PREFERRED EMBODIMENT

Figure 1:
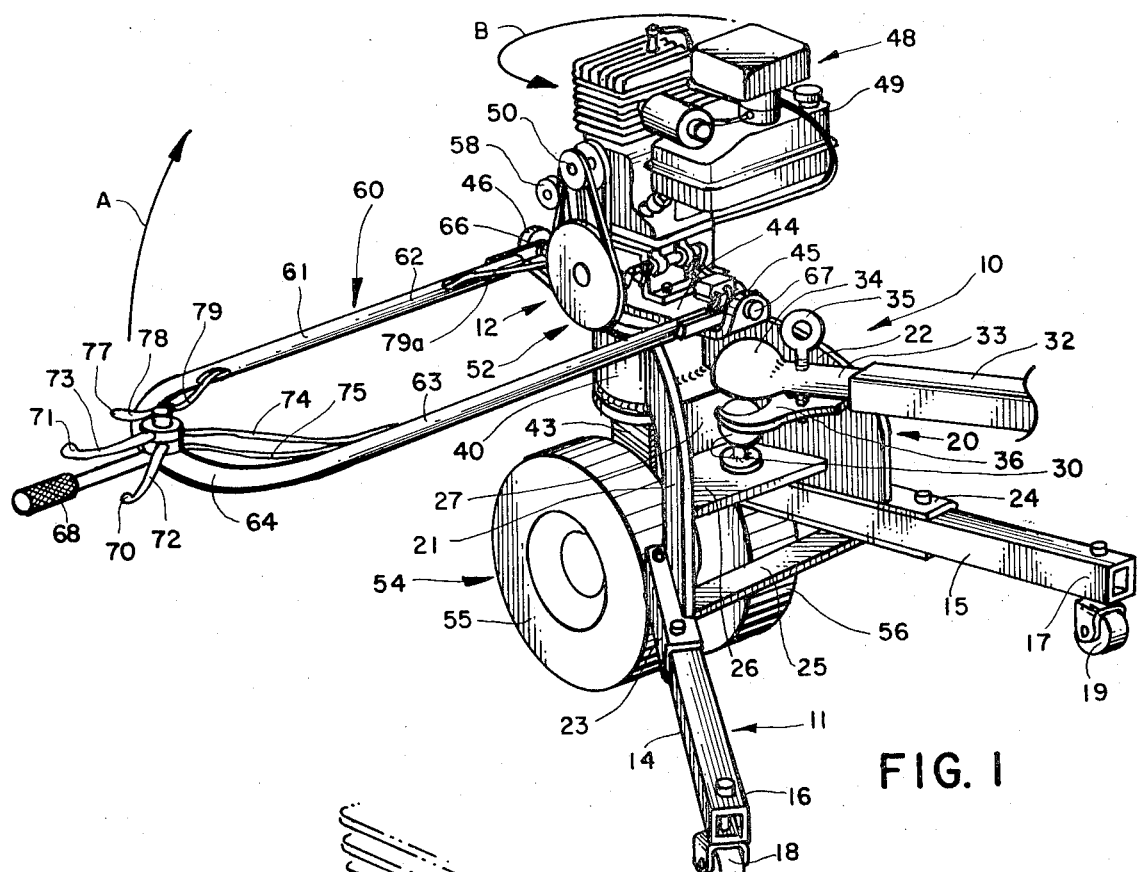
FIG. 1 is a perspective view of a tractor constructed in accordance with this invention, showing the steering mechanism positioned at one side of the tractor and a socket connection of a mobile home or the like raised above the tractor hitch.

Referring now to the detailed drawings and in particular FIG. 1 and FIG. 2 a tractor 10 is shown having a rear portion in the form of a mobile frame 11 and a fully rotatable front portion 12.

The mobile frame 11 has a pair of load bearing stringers 14 and 15 that converge forwardly towards the tractor front portion 12. The rearward ends 16 and 17 of stringers 14 and 15 are supported on rear wheels or casters, 18 and 19 respectively.

A linking neck means 20 includes a pair of guard plates 21 and 22 whose bottom sections are formed with mounting sleeves 23 and 24 that are rigidly connected to the front ends of the stringers 14 and 15. The guard plates 21 and 22 arch upwardly and project forwardly. A relatively low slung stiffening bar 25 rigidly interconnects the mounting sleeves 23 and 24 and a seat 26 and vertical wall 27 rigidly interconnect intermediate portions of the guard plates 21 and 22.

A ball type hitch 30 is anchored to the center of seat 26. A mobile home, aircraft, boat trailer, or any other type of vehicle is represented by numeral 32 which has a forwardly extending boom or draw rod 33. The outer extremity of draw rod 33 is equipped with a conventional socket 34 sized to fit over the ball hitch 30, a locking pin 35 and a locking plate 36. In FIG. 1 the socket 34 is shown raised above the ball hitch 30 while FIG. 2 shows the hitch 30 and socket 34 coupled together with the pin 35 positioned in locking plate 36.

The forward section of the linking neck means 20 is rigidly secured to a generally upright barrel 40. The leading edges or ends of the guard plates 21 and 22 are fixed to the barrel 40 at different points as best seen in FIG. 1 and FIG. 3. A wheel maneuvering space 41 as shown in FIG. 2 is defined by the peripheries of barrel 40, the mobile frame 11 generally and linking neck 20. The wheel maneuvering space 41 is beneath barrel 40 and ahead of the mobile frame 11.

Extending entirely through the barrel 40 is an erect chassis 43 terminating at its upper region in a flat and laterally extending platform 44. Diametrically opposed and outermost edges of the chassis platform 44 are bent or forged into upturned flanges 44 and 46 to constitute pivot points for a reason to be more fully described.

Mounted on chassis 43 is a conventional prime mover in the form of a gasoline motor 48 having a gas tank 49 and a power take-off shaft 50. The power take-off shaft 50 is coupled to a drive means 52 that includes a couple of pulley systems, drive belts, drive chains, etc., which shall be more fully described. The drive means 52 is operatively coupled to a drive wheel means 54 in the form of dual wheels, 55 and 56 spaced from one another for achieving better stability and also to accommodate some components of the drive means 52.

An actuating means 58 is operatively coupled to the drive means 52 for selectively activating the drive means 52 when the motor 48 is operating. A steering mechanism 60 is linked to the chassis 43. The steering mechanism includes a U-shaped swing bar 61 having a pair of side arms 62 and 63 joined by a cross arm, 64. The inner ends of the side arms 62 and 63 are pivotally coupled to the chassis platform flanges 45 and 46 by way of pivot pins 67 and 66 respectively. Extending outwardly from the center of cross arm 64 is a handle 68 for use by a workman in manipulating and maneuvering the tractor 10. The swing bar side arms 62 and 63 are sufficiently long and spaced from one another so that the U-shaped swing bar 61 may be swung from one side of the tractor 10 to the other as indicated by directional arrow A without striking or encountering motor 48, drive means 52, actuating means 58 or any other part of the tractor front portion 12.

The U-shaped swing bar 61 or at least side arms 62 and 63 are hollow. The actuating means 58 has a pair of clutches 70 and 71 which include hand levers 72 and 73 located on the swing bar 61 at positions for convenient access by the workman. Extending from the hand levers 72 and 73 are control cables 74 and 75 which run through a hollow space in side arm 63 of the steering mechanism 60. In a similar manner, a throttle 77 includes a hand lever 78 mounted on the swing bar 61. Extending through a portion of side arm 62 between hand lever 78 and motor 48 is a control cable 79. Control cable segment 79a exits side arm 62 and is routed to the motor 48 as best seen in FIG. 2.

The tractor front portion 12 is mounted relative to the tractor mobile frame 11 in such a way that the front portion 12 can be swivelled through 360-degrees either clockwise or counterclockwise as indicated by directional arrow B. The connection which makes this rotation possible shall now be explained.

Referring primarily to FIG. 3 the chassis 43 is essentially a hollow column of general rectangular cross section. The laterally extending upper platform 44 is formed through a middle region with a space 80 through which is disposed a drive chain 143 of the drive means 52 (shown in FIG. 5, not in FIG. 3).

The vertically oriented barrel 40 has an upper part 82 and a lower part 83, both of which are formed with circular tracks for accommodating a plurality of round bearing elements. By way of example, barrel upper part 82 has a circular ball race 84 to assist in accommodating a plurality of ball bearings 85.

A drum 86 is swivelly coupled to and disposed within the barrel 40 in such a manner that the drum 86 can be rotated freely through full clockwise or counterclockwise rotation. Drum 86 has a radially outwardly extending lower flange 87 formed with a circular ball race for coacting with the ball race in barrel lower part 83 to accommodate a series of ball bearings 89. A top part 90 of drum 86 is formed with four or more attachment holes such as attachment holes 92 and 93.

The upper part of drum 86 is constituted by a separable bearing ring 94 which has a radially outwardly extending flange 95 that forms a ball race (not shown) to coact with ball race 84 in accommodating the ball bearings 85. A series of attachment holes is formed through ring 94 such as attachment holes 96 and 97 to register with the attachment holes through the drum 86. For purposes of illustration, attachment holes 96 and 97 register with attachment holes 92 and 93. A bolt 98 may be inserted through attachment hole 97, registering attachment hole 93 and registering attachment hole 99 in a spanner plate component of the chassis 43.

Four or more bolts such as bolt 98 interconnect the chassis 43 and drum 86 so that they can be rotated together as a unit relative to the stationary or fixed position of the barrel 40 and linking neck 20. Power transmission shafts, drive chains and a gear reduction means are partially packaged within drum 86 and between the side plates 134 and 135 of the chassis 43.

Figure 4:
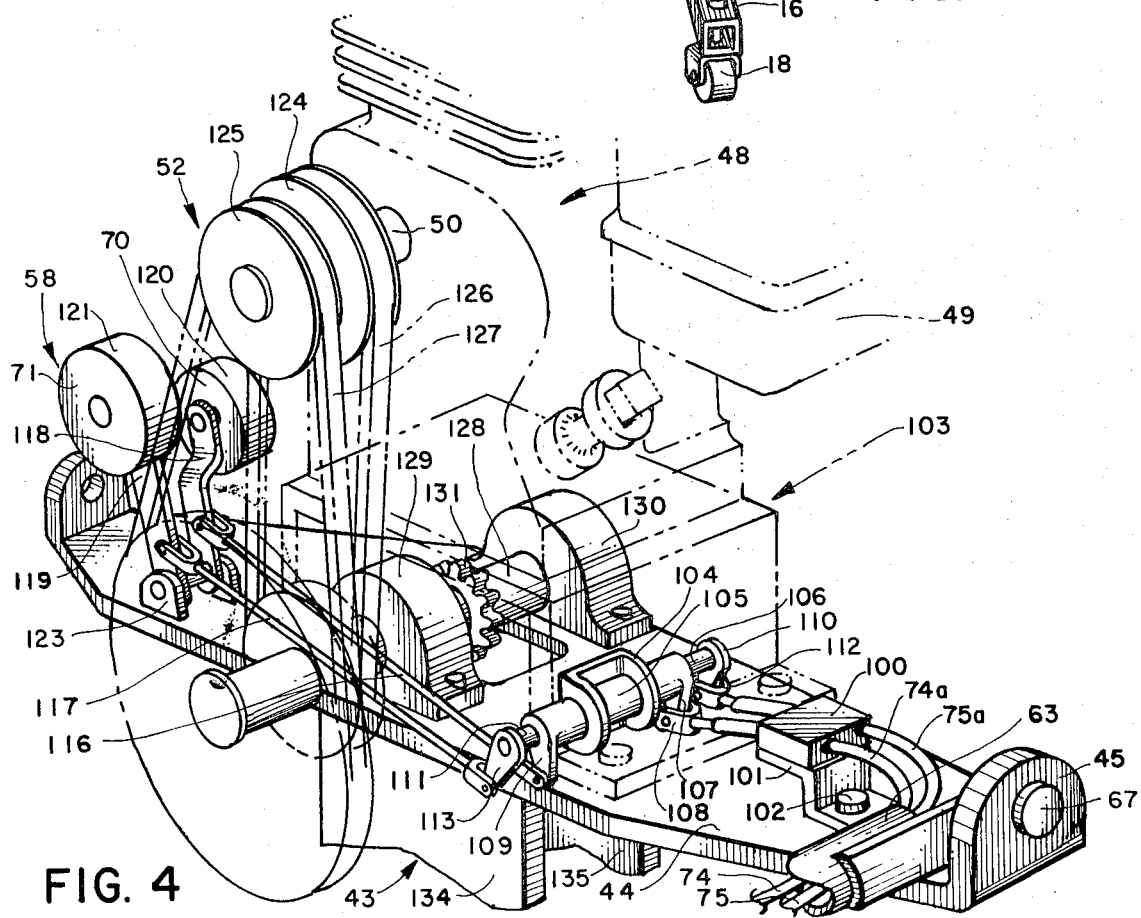
FIG. 4 is a sectional, partly detailed, partly phantom line view of the actuating means and drive means of this invention; and, FIG. 5 is basically a schematic view showing coaction between the actuating means, drive means, and dual wheels associated with the tractor of this invention.

Referring now primarily to FIG. 4, portions 74a and 75a of the clutch control cables 74 and 75 are shown. These control cable portions 74a and 75a are slipped through openings in a guide block 100 mounted on a pedestal 101 fixed by a connector 102 to the chassis platform 44. The chassis 43 has a housing portion 103 which encloses and protects some upper region components of the drive means 52. A bracket 104 is connected to a side of housing portion 103 and includes a pair of outwardly extending arms with openings.

The actuator means 58 includes a hollow sleeve 105 that is journaled or rotatably coupled within the arms of bracket 104. Rotatably coupled within hollow sleeve 105 is a rod 106 which is longer than and extends beyond the ends of the hollow sleeve, 105. A crank arm 107 depending from hollow sleeve 105 is coupled to control cable 74 by way of a tie 108. A fixed pivot arm 109 depends from the opposite end of hollow sleeve 105. Similarly, a crank arm 110 depends from one end of rotatable rod 106 and is connected to control cable 75 by way of a tie coupling 112. A depending pivot arm 113 is fixed to the opposite end of rod 106.

A pair of pull rods or force transmitting rods 116 and 117 are connected to the hollow sleeve pivot arm 109 and the rotatable rod pivot arm 113 respectively. The opposite ends of the generally parallel rods 116 and 117 are linked to a pair of corresponding rocker arms 118 and 119 whose bases are pivotally coupled within a bracket 123 fixed to the chassis platform 44. The upper ends of the rocker arms 118 and 119 rotatably mount a pair of idler wheels 120 and 121, respectively.

Referring now primarily to FIG. 4, the drive means 52 has dual speed capability, i.e., relatively low speed when the tractor 10 is hauling a vehicle such as a mobile home and a relatively high speed when the tractor 10 itself is being moved from one position to another in an unhitched condition. Drive means 52 has a pulley system 124 associated with the high speed capability and another pulley system 125 associated with the load bearing conditions. When clutch 70 of the actuating means 58 is manipulated to engage idler wheel 120 with pulley system 124 — relatively high speed will be attained. In a similar manner, when the other clutch 71 is manipulated to cause idler wheel 121 to engage pulley system 125 — then relatively low speed by the tractor 10 will be achieved. A workman maneuvering the tractor 10 can easily and conveniently disengage one clutch and engage the other clutch. The idler wheels 120 and 121 can specifically be extended inwardly and into engagement with pulley belts 126 and 127, respectively to reduce the slack normally present in the belts.

The pulley systems 124 and 125 are coupled to a common power take-off shaft 50 extending from the motor 48. Pulley system 124 has a relatively small diameter drive disc fixed to a power transmission shaft while pulley system 125 has a relatively large diameter drive disc fixed to the power transmission shaft 128. Shaft 128 is journaled within blocks 129 and 130 mounted to the chassis platform 44. Between the blocks 129 and 130 is a sprocket gear 131.

In FIG. 4, a portion of the gear train associated with drive means 52 extends between the side plates 134 and 135 of chassis 43.

Referring now specifically to FIG. 5 which is a schematic diagram of drive means 52 and actuating means 58 to a lesser extent — the relatively small diameter drive disc 138 of pulley system 124 and the relatively large diameter drive disc 139 of pulley system 125 are shown keyed to the power transmission shaft 128. The pulley belts 126 and 127 can be selectively engaged by idler wheels 120 and 121 that are movable inwardly and outwardly as represented by directional arrows D and C respectively.

The drive means 52 incorporates a gear reduction means 140. Beneath shaft 128 is another power transmission shaft 144 carrying a sprocket 141 around which is trained a drive chain 143. Another sprocket gear 142 of smaller diameter than sprocket 141 is fixed to shaft 144 and is linked by drive chain 148 to a power transmission shaft 151 to which a sprocket wheel 149 is connected. Another sprocket gear 150 of less diameter than sprocket gear 149 transmits rotary motion to a sprocket gear 155 fixed to the axle 156 associated with the drive wheel means 54. A drive chain 154 surrounds sprocket gear 150 and sprocket gear 155.

The drive wheel means 54 is constituted by the pair of wheels 55 and 56, set apart from one another by a sufficient distance to accommodate the flight of chain 154 and a pair of axle forks 81 associated with the chassis side plates 134 and 135, as best seen in FIG. 3.

For safety reasons, wheel locks may be attached to the rear wheels or casters 18 and 19 to prevent the tractor 10 from swinging out of position as a vehicle 32 is being coupled to or uncoupled from hitch 30. Moreover, a stabilizing arm may be connected to one or both of the stringers 14 and 15 to further facilitate coupling and uncoupling hitch 30 and socket 34.

OPERATION

Keeping the above construction in mind it can be understood how previously described disadvantages of conventional towing devices are overcome or substantially eliminated by this invention.

A mobile home or other vehicle 32 may be attached to the tractor 10 by way of coupling the detachable socket 34 to the ball type hitch conveniently connected to a central section of the mobile frame 11. After the motor 48 is activated, a single workman may then cause tractor 10 to tow the vehicle to some desired new location. He manipulates the hand lever 73 associated with clutch 71 to pull taut control cable 75. The tension exerted by control cable 45 forces idler wheel 121 to extend inwardly as indicated by directional arrow C to engage and take up slack within pulley belt 127.

With the drive means 52 thus activated, the drive wheels 55 and 56 are caused to rotate at relatively low speeds. The tractor 10 travels at relatively low speeds with the vehicle 32 in tow and progresses in a direction dictated by maneuvering of the steering mechanism 60 by the workman.

If space limitations or obstacles require sharp turning maneuvers or quick directional reversals, the workman can handle these requirements or situations as they arise. He has great flexibility in controlling the performance of tractor 10 and is prepared to negotiate the tractor 10 to abrupt direction changes.

The workman may swing the entire steering mechanism 60 over the motor 48 from left to right or vice versa and then continue to steer the tractor 10 from the other side. Most importantly, the tractor front portion 12 can be rotated through a full range of angular movements because of the full swivel connection between barrel 40 and drum 86 which allows the tractor front portion 12 to be spun through 360-degrees in either direction relative to its own axis and relative to the fixed position of the tractor mobile frame 11. For purposes of illustration, the gear reduction means 140 reduces the power take-off shaft rotational speed of 3,600 RPM to a wheel or travelling speed of 18 RPM. Also, for purposes of illustration when the pulley system 125 is disengaged and the other pulley system 124 is engaged, the wheel speed may be 40 RPM, i.e., much faster for walking speed conditions.

Inasmuch as the major portion of the drive emans 52 is confined within and generally packaged by the chassis 43 and barrel 40, this is a safety factor minimizing the risk that the workman or some object might become caught in or on the gearing.

From the foregoing it will be evident that the present invention has provided a tractor with a full swivel front section in which all of the various advantages are fully realized.

What is claimed is:

1. A tractor having a full swivel front section, comprising:
    a. a mobile frame with a hitch for detachable engagement with a vehicle to be towed;
    b. an upright barrel fixed to a front portion of the mobile frame, the mobile frame and barrel defining a wheel maneuvering space beneath the barrel and ahead of the mobile frame;
    c. a drum swivelly coupled to and disposed within the barrel for full 360-degree clockwise and counterclockwise rotation;
    d. a chassis extending through and coupled to the drum, the chassis having a top section extending above the barrel and the bottom section extending beneath the barrel;
    e. a motor coupled to the chassis top section;
    f. a steering mechanism connected to the motor or chassis top section for maneuvering the tractor;
    g. drive wheel means coupled to the chassis bottom section fully beneath the barrel and drum and sufficiently spaced from the mobile frame so that the drive wheel means may be fully turned through 360-degrees within the wheel maneuvering space without contacting the mobile frame;
    h. drive means operatively interconnecting the motor and drive wheel means; and,
    i. actuating means operatively coupled to the drive means for selectively activating the drive means when the motor is in operation.
2. The structure according to claim 1 wherein;
    one end of the drum is formed with a radially outwardly extending flange that coacts with the corresponding end of the barrel in defining a first circular track for a plurality of round bearing elements; and,
    the other end of the drum includes a separable ring that coacts with the corresponding ends of the barrel in defining a second circular track for a plurality of round bearing elements.
3. The structure according to claim 2 wherein;
    the separable ring fully surrounds and is connected to the chassis.
4. The structure according to claim 1 wherein;
    the chassis top section has a platform which pivotally mounts the steering mechanism.
5. The structure according to claim 4 wherein;
    the chassis is generally a hollow column,
    the chassis platform is formed with a space above the drum, and,
    a portion of the drive means extends through the space and is generally confined by the chassis.
6. The structure according to claim 5 wherein;
    said portion of the drive means is constituted by chains, sprockets and power transmission shafts, and,
    a gear reduction means is built into the drive means and is generally confined by the chassis.
7. The structure according to claim 1 wherein;
    the drive means has dual speed capability and includes:
    a first power transmission shaft, and,
    first and second pulley systems coupled to a power take-off shaft of the motor, the first pulley system having a relatively large diameter drive disc fixed to the first power transmission shaft and the second pulley system having a relatively small diameter disc fixed to the first power transmission shaft,
    wherein, when the first and second pulley systems are selectively activated by the actuating means the drive wheel means is caused to travel at relatively low and high speeds respectively.
8. The structure according to claim 7 wherein;
    the drive means incorporates:
    gear reduction means having a second power transmission shaft positioned beneath the first power transmission shaft and journaled within the drum, the second power transmission shaft being linked to the first power transmission shaft through a first drive chain, and,
    an axle linked to the second power transmission shaft through a second drive chain, the axle being operatively connected to the drive wheel means.
9. The structure according to claim 7 wherein;
    the drive wheel means is a pair of wheels.
10. The structure according to claim 7 wherein;
    the actuating means includes:
    first and second clutches arranged to selectively activate corresponding first and second pulley systems.
11. The structure according to claim 10 wherein;
    the first and second clutches include:
    first and second idler wheels capable of being forced into selective engagement with the first and second pulley systems.
12. The structure according to claim 11 including:
    first and second hand levers mounted on the steering mechanism and having first and second control cables;

a hollow sleeve rotatably mounted to the chassis and having a crank arm at one end fixed to the second control cable and a fixed pivot arm at its other end, this fixed pivot arm being coupled to the second idler wheel by a rod and rocker arm linkage, and, a rod longer than and rotatably journaled within the hollow sleeve and having a crank arm at one end fixed to the first control cable and a fixed pivot arm at its other end, this fixed pivot arm being coupled to the first idler wheel by a rod and rocker arm linkage.

13. The structure according to claim 1 wherein;
the steering mechanism includes:
a U-shaped swing bar pivotally connected by its side arms to the chassis at points on opposite sides of the motor, the side arms being sufficiently long and spaced from one another to clear the motor and enable the swing bar to be swung over the motor from one side to the other.

14. The structure according to claim 13 wherein;
the steering mechanism includes:
a handle extending outwardly from the cross arm of the swing bar to facilitate manipulation of the tractor by a workman.

15. The structure according to claim 13 wherein;
the actuating means includes a clutch having a first hand lever mounted on the swing bar and a control cable; and,
the side arms of the swing bar are partially hollow to retain and guide the segment of the control cable.

16. The structure according to claim 15 including:
a throttle having a hand lever mounted on the swing bar and a control cable extending through a portion of the U-shaped swing bar and leading to the motor.

17. The structure according to claim 1 wherein;
the mobile frame is V-shaped and includes:
a pair of stringers supported on wheels and which converge forwardly towards the barrel, and,
a generally upwardly extending linking neck rigidly interconnecting forward portions of the stringers to the barrel and arched to hold the barrel fully above and in front of the stringers.

18. The structure according to claim 17 wherein;
the linking neck includes a pair of guard plates with their bases fixed to forward ends of corresponding stringers and their upper portions fixed to the barrel,
the hitch is a ball and socket type hitch, and,
a seat is connected to and spans between the guard plates at a level above the stringers and mounts the hitch.

19. The structure according to claim 1 wherein;
one end of the drum is formed with a radially outwardly extending flange that coacts with the corresponding end of the barrel in defining a first circular track for a plurality of round bearing elements, the other end of the drum includes a separable ring that coacts with the corresponding end of the barrel in defining a second circular track for a plurality of round bearing elements,
the drive wheel means includes a pair of wheels, and, the steering mechanism includes a U-shaped swing bar pivotally connected by its side arms to the chassis at points on opposite sides of the motor, the side arms being sufficiently long and spaced from one another to clear the motor and enable the swing bar to be swung over the motor from one side to the other.

20. The structure according to claim 19 wherein;
the chassis is generally a hollow column and its top section forms a platform defining a space above the drum,
the drive means has dual speed capability and includes a first power transmission shaft,
first and second pulley systems are provided and coupled to a power take-off shaft of the motor, the first pulley system having a relatively large diameter drive disc fixed to the power transmission shaft and the second pulley system has a relatively small diameter drive disc fixed to the power transmission shaft.

A portion of the drive means extends through the space in the chassis platform and is generally confined by the chassis,
wherein, when the first and second pulley systems are selectively activated by the actuating means the two drive wheels are caused to travel at relatively low and high speeds respectively.

* * * * *